US011529620B2

(12) United States Patent
Parvulescu et al.

(10) Patent No.: US 11,529,620 B2
(45) Date of Patent: Dec. 20, 2022

(54) PROCESS FOR THE PRODUCTION OF A ZEOLITIC MATERIAL VIA INTERZEOLITIC CONVERSION

(71) Applicant: BASF SE, Ludwigshafen am Rhein (DE)

(72) Inventors: Andrei-Nicolae Parvulescu, Ludwigshafen (DE); Robert McGuire, Florham Park, NJ (US); Ulrich Mueller, Ludwigshafen (DE); Xiangju Meng, Hangzhou (CN); Feng-Shou Xiao, Hangzhou (CN); Toshiyuki Yokoi, Midori-ku (JP); Dirk De Vos, Leuven (BE); Bernd Marler, Bochum (DE); Hermann Gies, Bochum (DE); Ute Kolb, Mainz (DE); Weiping Zhang, Dalian (CN)

(73) Assignee: BASF Corporation, Florham Park, NJ (US)

( * ) Notice: Subject to any disclaimer, the term of this patent is extended or adjusted under 35 U.S.C. 154(b) by 9 days.

(21) Appl. No.: 17/057,970

(22) PCT Filed: Jun. 18, 2019

(86) PCT No.: PCT/CN2019/091745
§ 371 (c)(1),
(2) Date: Nov. 23, 2020

(87) PCT Pub. No.: WO2019/242618
PCT Pub. Date: Dec. 26, 2019

(65) Prior Publication Data
US 2021/0299642 A1 Sep. 30, 2021

(30) Foreign Application Priority Data

Jun. 20, 2018 (WO) ................ PCT/CN2018/091924

(51) Int. Cl.
| | |
|---|---|
| C01B 39/02 | (2006.01) |
| B01J 29/76 | (2006.01) |
| B01D 53/94 | (2006.01) |
| B01J 35/10 | (2006.01) |
| B01J 37/04 | (2006.01) |
| B01J 37/06 | (2006.01) |
| B01J 37/08 | (2006.01) |
| B01J 37/30 | (2006.01) |
| C01B 39/48 | (2006.01) |

(52) U.S. Cl.
CPC .......... *B01J 29/76* (2013.01); *B01D 53/9418* (2013.01); *B01J 35/1019* (2013.01); *B01J 35/1023* (2013.01); *B01J 35/1038* (2013.01); *B01J 37/04* (2013.01); *B01J 37/06* (2013.01); *B01J 37/082* (2013.01); *B01J 37/30* (2013.01); *C01B 39/48* (2013.01); *B01D 2255/20761* (2013.01); *B01D 2255/50* (2013.01); *C01P 2002/72* (2013.01)

(58) Field of Classification Search
None
See application file for complete search history.

(56) References Cited

U.S. PATENT DOCUMENTS

| | | | | |
|---|---|---|---|---|
| 4,503,024 A | * | 3/1985 | Bourgogne | ......... C01B 33/2869 423/DIG. 25 |
| 4,654,316 A | * | 3/1987 | Barri | ......................... C07C 2/00 423/112 |
| 5,958,370 A | | 9/1999 | Zones et al. | |
| 7,008,610 B2 | | 3/2006 | Cao et al. | |
| 9,643,852 B2 | | 5/2017 | Cao et al. | |
| 10,479,692 B2 | * | 11/2019 | Itabashi | .................. C01B 39/26 |
| 2015/0118151 A1 | | 4/2015 | Cao et al. | |

(Continued)

FOREIGN PATENT DOCUMENTS

| | | |
|---|---|---|
| CN | 1898158 A | 1/2007 |
| CN | 104837770 A | 8/2015 |
| CN | 106629770 * | 5/2017 |

(Continued)

OTHER PUBLICATIONS

International Search Report dated Sep. 2, 2019 in PCT/CN2019/091745 filed on Jun. 18, 2019.
Nuria Martin et al., Nanocrystalline SSZ-39 zeolite as an efficient catalyst for the methanol-to-olefin {MTO} process, Chem. Commun., 2016. 52, 6072.
Toshihiro Maruo et al., Facile Sunthesis of AEI Zeolites by Hydrothermal Conversion of FAU Zeolites in the Presence of Tetraethylphosphonium Catons, Chem. Lett., vol. 43, pp. 302-304.
Masaya Itakura et al., Synthesis of High-silica CHA Zeolite from FAU Zeolite in the Presence of Benzyltrimethylammonium Hydroxide, Chem. Lett., vol. 37, No. 9 (2008).

(Continued)

*Primary Examiner* — Sheng H Davis
(74) *Attorney, Agent, or Firm* — Finnegan, Henderson, Farabow, Garrett & Dunner LLP

(57) ABSTRACT

The present invention relates to a process for the preparation of a zeolitic material $SiO_2$ and $X_2O_3$ in its framework structure, wherein X stands for a trivalent element, wherein said process comprises interzeolitic conversion of a first zeolitic material comprising $SiO_2$ and $X_2O_3$ in its framework structure, wherein the first zeolitic material has an FER-, TON-, MTT-, BEA-, MEL-, MWW-, MFS-, and/or MFI-type framework structure to a second zeolitic material comprising $SiO_2$ and $X_2O_3$ in its framework structure, wherein the second zeolitic material obtained in (2) has a different type of framework structure than the first zeolitic material. Furthermore, the present invention relates to a zeolitic material per se as obtainable and/or obtained according to the inventive process and to its use, in particular as a molecular sieve, as an adsorbent, for ion-exchange, or as a catalyst and/or as a catalyst support.

14 Claims, 3 Drawing Sheets

(56) References Cited

U.S. PATENT DOCUMENTS

2019/0009257 A1    1/2019   Takamitsu et al.

FOREIGN PATENT DOCUMENTS

| CN | 107922206 A | 4/2018 |
| EP | 3 345 869 A1 | 7/2018 |
| JP | 2017-202951 A | 11/2017 |
| WO | WO 2017/038662 A1 | 3/2017 |
| WO | WO 2018/113566 A1 | 6/2018 |

OTHER PUBLICATIONS

Zones S., Conversion of Faujasites to High-silica Chabazite SSZ-13 in the Presence of N,N,N-Trimethyl-1-adamantammonium Iodide, J. Chem. Soc. Faraday Trans, 8(22), 3709-3716 (1991).

* cited by examiner

PROCESS FOR THE PRODUCTION OF A ZEOLITIC MATERIAL VIA INTERZEOLITIC CONVERSION

TECHNICAL FIELD

The present invention relates to a process for the preparation of a zeolitic material $SiO_2$ and $X_2O_3$ in its framework structure, wherein X stands for a trivalent element, wherein said process comprises interzeolitic conversion of a first zeolitic material comprising $SiO_2$ and $X_2O_3$ in its framework structure, wherein the first zeolitic material has an FER-, TON-, MTT-, BEA-, MEL-, MWW-, MFS-, and/or MFI-type framework structure to a second zeolitic material comprising $SiO_2$ and $X_2O_3$ in its framework structure, wherein the second zeolitic material obtained in (2) has a different type of framework structure than the first zeolitic material. Furthermore, the present invention relates to a zeolitic material per se as obtainable and/or obtained according to the inventive process and to its use, in particular as a molecular sieve, as an adsorbent, for ion-exchange, or as a catalyst and/or as a catalyst support.

INTRODUCTION

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 6th edition, Elsevier, London, England (2007).

Zeolitic materials having framework type AEI are known to be potentially effective as catalysts or catalyst components for treating combustion exhaust gas in industrial applications, for example for converting nitrogen oxides ($NO_x$) in an exhaust gas stream. Moliner, M. et al. in Chem. Commun. 2012, 48, pages 8264-8266 concerns Cu—SSZ-39 and its use for the SCR of nitrogen oxides NOx, wherein the SSZ-39 is produced with the use of N,N-dimethyl-3,5-dimethylpiperidinium cations as the organotemplate. Martin, N. et al. in Chem. Commun. 2015, 51, 11030-11033 concerns the synthesis of Cu—SSZ-39 and its use as a catalyst in the SCR of nitrogen oxides NOx. As regards the methods of synthesis of the SSZ-39 zeolite in said document, these include the use of N,N-dimethyl-3,5-dimethylpiperidinium cations as well as of tetraethylphosphonium cations.

Zeolitic materials are however highly versatile and known to find broad applications, in particular in catalytic applications.

In view of the decreasing amount of oil reserves which constitute the raw material for the production of short-chain hydrocarbons and derivatives thereof, alternative processes for the production of such base chemicals are of a growing importance. In such alternative processes for the production of short-chain hydrocarbons and derivatives thereof, often highly specific catalysts are used therein for converting other raw materials and/or chemicals to hydrocarbons and their derivatives such as in particular short-chain olefins. A particular challenge involved in such processes not only relies in the optimal choice of reaction parameters but, more importantly, in the use of particular catalysts allowing for the highly efficient and selective conversion to a desired hydrocarbon or derivative thereof such as in particular olefinic fractions. In this respect, processes in which methanol is employed as the starting material, are of particular importance, wherein their catalytic conversion usually leads to a mixture of hydrocarbons and derivatives thereof, in particular olefins, paraffins, and aromatics.

Thus, the particular challenge in such catalytic conversions resides in the optimization and the fine tuning of the catalysts (particularly the zeolite pore structure, acid type and strength) employed as well as the process architecture and parameters such that a high selectivity towards as few products as possible may be achieved. For this reason, such processes are often named after the products for which a particularly high selectivity may be achieved in the process. Accordingly, processes which have been developed in the past decades towards the conversion of oxygenates to olefins and in particular of methanol to olefins which have gained increasing importance in view of dwindling oil reserves are accordingly designated as methanol-to-olefin-processes (MTO-processes for methanol to olefins).

Methods for the synthesis of zeolitic materials having an AEI-type framework structure include the interzeolitic transformation from zeolitic materials having a framework structure other than AEI. Thus, Maruo, T. et al. in Chem. Lett. 2014, 43, page 302-304 relates to the synthesis of AEI zeolites by hydrothermal conversion of FAU zeolites in the presence of tetraethylphosphonium cations. Unpublished international patent applications PCT/CN2017/115938 and PCT/CN2017/112343 respectively relate to a process for the production of zeolitic materials including those having an AEI-type framework structure via interzeolitic conversion.

Despite the many methods of synthesizing zeolitic materials and in particular of those having an AEI-type framework structure, there nevertheless remains a need for the provision of a cost-effective process for the production thereof. Furthermore, there is an ongoing need for the production of zeolitic materials displaying new physical and chemical characteristics leading to improved properties in their fields of application, and in particular in catalysis such as when implemented for the conversion of $NO_x$ in selective catalytic reduction (SCR) or for the conversion of methanol to olefins (MTO).

DETAILED DESCRIPTION

It was therefore the object of the present invention to provide an improved synthesis methodology for the production of a zeolitic material, and in particular of a zeolitic material having an AEI-type framework structure, which affords the desired materials in a highly cost-effective manner. Furthermore, it was the object of the present invention to provide a zeolitic material, and in particular of a zeolitic material having an AEI-type framework structure, displaying novel physical and chemical properties leading to improved properties in various applications and in particular in the field of heterogeneous catalysis. Thus it has surprisingly been found that new zeolitic starting materials, and in particular zeolitic starting materials for interzeolitic conversion may be used which are obtainable with a higher cost-effectiveness, such that the production of the zeolitic material from interzeolitic conversion may itself be obtained with a higher cost-effectiveness in view of the use of such materials. Furthermore, it has quite unexpectedly been found that known interzeolitic conversions may be conducted starting from other framework types such as to afford materials with new physical and chemical properties in view of the differences in the starting materials, which may accordingly lead to differences in the physical and chemical properties of the zeolitic materials obtained from the interzeolitic conversion. As a result, it has surprisingly been found that the versatility of the zeolitic materials obtained from interzeolitic conversion may be increased by the variation of the starting materials, as a result of which new materials displaying improved properties for specific applications may be obtained.

Thus, the present invention relates to a process for the preparation of a zeolitic material comprising $SiO_2$ and $X_2O_3$ in its framework structure, wherein X stands for a trivalent element, wherein said process comprises:

(1) preparing a mixture comprising one or more structure directing agents and a first zeolitic material comprising $SiO_2$ and $X_2O_3$ in its framework structure, wherein the first zeolitic material has an FER-, TON-, MTT-, BEA-, MEL-, MWW-, MFS-, and/or MFI-type framework structure, preferably a BEA- and/or MFI-type framework structure;

(2) heating the mixture obtained in (1) for obtaining a second zeolitic material comprising $SiO_2$ and $X_2O_3$ in its framework structure, wherein the second zeolitic material obtained in (2) has a different type of framework structure than the first zeolitic material contained in the mixture obtained in (1).

Preferably, the mixture prepared according to (1) further comprises one or more solvents, wherein said one or more solvents preferably comprises water, more preferably distilled water, wherein more preferably water is contained as the one or more solvents in the mixture prepared according to (1), more preferably distilled water. Preferably, the mixture prepared in (1) and heated in (2) further comprises at least one source for $OH^-$, wherein said at least one source for $OH^-$ preferably comprises a metal hydroxide, more preferably a hydroxide of an alkali metal M, more preferably sodium and/or potassium hydroxide, and more preferably sodium hydroxide, wherein more preferably the at least one source for $OH^-$ is sodium hydroxide.

While there are no specific restrictions in step (1) of the process regarding the first zeolitic material which has an FER-, TON-, MTT-, BEA-, MEL-, MWW-, MFS-, and/or MFI-type framework structure, it is preferred that the first zeolitic material having a BEA-type framework structure is selected from the group consisting of zeolite beta, Tschernichite, [B—Si—O]—*BEA, CIT-6, [Ga—Si—O]—*BEA, Beta polymorph B, SSZ-26, SSZ-33, Beta polymorph A, [Ti—Si—O]—*BEA, and pure silica beta, including mixtures of two or more thereof, more preferably from the group consisting of zeolite beta, CIT-6, Beta polymorph B, SSZ-26, SSZ-33, Beta polymorph A, and pure silica beta, including mixtures of two or more thereof, wherein more preferably the first zeolitic material having a BEA-type framework structure comprises zeolite beta, preferably zeolite beta obtained from organotemplate-free synthesis, wherein more preferably the first zeolitic material having a BEA-type framework structure is zeolite beta, preferably zeolite beta obtained from organotemplate mediated synthesis or obtained from organotemplate-free synthesis, and more preferably zeolite beta obtained from organo-template-free synthesis.

While there are no specific restrictions in step (1) of the process regarding the first zeolitic material which has an FER-, TON-, MTT-, BEA-, MEL-, MWW-, MFS-, and/or MFI-type framework structure, it is preferred that the first zeolitic material having an MFI-type framework structure is selected from the group consisting of Silicalite, ZSM-5, [Fe—Si—O]-MFI, [Ga—Si—O]-MFI, [As—Si—O]-MFI, AMS-1B, AZ-1, Bor-C, Encilite, Boralite C, FZ-1, LZ-105, Mutinaite, NU-4, NU-5, TS-1, TSZ, TSZ-III, TZ-01, USC-4, USI-108, ZBH, ZKQ-1B, ZMQ-TB, MnS-1, and FeS-1, including mixtures of two or more thereof, more preferably from the group consisting of Silicalite, ZSM-5, AMS-1B, AZ-1, Encilite, FZ-1, LZ-105, Mutinaite, NU-4, NU-5, TS-1, TSZ, TSZ-III, TZ-01, USC-4, USI-108, ZBH, ZKQ-1B, and ZMQ-TB, including mixtures of two or more thereof, wherein more preferably the first zeolitic material having an MFI-type framework structure comprises Silicalite and/or ZSM-5, preferably ZSM-5, wherein more preferably the first zeolitic material having an MFI-type framework structure is zeolite Silicalite and/or ZSM-5, preferably ZSM-5.

While there are no specific restrictions in step (1) of the process regarding the first zeolitic material which has an FER-, TON-, MTT-, BEA-, MEL-, MWW-, MFS-, and/or MFI-type framework structure, it is preferred that the first zeolitic material having an FER-type framework structure is selected from the group consisting of Ferrierite, [Ga—Si—O]-FER, [Si—O]-FER, FU-9, ISI-6, NU-23, Sr-D, ZSM-35, and [B—Si—O]-FER, including mixtures of two or more thereof, more preferably from the group consisting of Ferrierite, FU-9, ISI-6, NU-23, and ZSM-35, including mixtures of two or more thereof, wherein more preferably the first zeolitic material having an FER-type framework structure comprises ZSM-35, wherein more preferably the first zeolitic material having an FER-type framework structure is ZSM-35.

While there are no specific restrictions in step (1) of the process regarding the first zeolitic material which has an FER-, TON-, MTT-, BEA-, MEL-, MWW-, MFS-, and/or MFI-type framework structure, it is preferred that the first zeolitic material having an MEL-type framework structure is selected from the group consisting of Boralite D, SSZ-46, and ZSM-11, including mixtures of two or more thereof, wherein more preferably the first zeolitic material having an MEL-type framework structure comprises ZSM-11, wherein more preferably the first zeolitic material having an MEL-type framework structure is ZSM-11.

While there are no specific restrictions in step (1) of the process regarding the first zeolitic material which has an FER-, TON-, MTT-, BEA-, MEL-, MWW-, MFS-, and/or MFI-type framework structure, it is preferred that the first zeolitic material having an TON-type framework structure is selected from the group consisting of Theta-1, ISI-1, NU-10, KZ-2, and ZSM-22, including mixtures of two or more thereof, wherein more preferably the first zeolitic material having an TON-type framework structure comprises ZSM-22, wherein more preferably the first zeolitic material having an TON-type framework structure is ZSM-22.

While there are no specific restrictions in step (1) of the process regarding the first zeolitic material which has an FER-, TON-, MTT-, BEA-, MEL-, MWW-, MFS-, and/or MFI-type framework structure, it is preferred that the first zeolitic material having an MFS-type framework structure comprises ZSM-57, wherein more preferably the first zeolitic material having an MFS-type framework structure is ZSM-57.

While there are no specific restrictions in step (1) of the process regarding the first zeolitic material which has an FER-, TON-, MTT-, BEA-, MEL-, MWW-, MFS-, and/or MFI-type framework structure, it is preferred that the first zeolitic material having an MTT-type framework structure is selected from the group consisting of EU-13, ISI-4, and KZ-1, and ZSM-23, including mixtures of two or more thereof,
wherein more preferably the first zeolitic material having an MTT-type framework structure comprises ZSM-23,
wherein more preferably the first zeolitic material having an MTT-type framework structure is ZSM-23.

While there are no specific restrictions in step (1) of the process regarding the first zeolitic material which has an FER-, TON-, MTT-, BEA-, MEL-, MWW-, MFS-, and/or MFI-type framework structure, it is preferred that the first zeolitic material having an MWW-type framework structure is selected from the group consisting of MCM-22, ERB-1, ITQ-1, PSH-3, SSZ-25, and MCM-22, including mixtures of two or more thereof,
wherein more preferably the first zeolitic material having an MWW-type framework structure comprises MCM-22,
wherein more preferably the first zeolitic material having an MWW-type framework structure is MCM-22.

Within the meaning of the present invention and unless stated otherwise, the compounds designated as "MCM-22", "ERB-1", "ITQ-1", "PSH-3", and "SSZ-25" respectively stand for the Al-containing form thereof, i.e. Al-MCM-22, Al-ERB-1, Al-ITQ-1, Al-PSH-3, and Al-SSZ-25, respectively.

With regard to the second zeolitic material obtained in (2) which has a different type of framework structure than the first zeolitic material contained in the mixture obtained in (1), preferably the second zeolitic material obtained in (2) has a CHA-type framework structure, wherein preferably the zeolitic material having a CHA-type framework structure is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li—Na| [Al—Si—O]-CHA, (Ni(deta)2)-UT-6, SSZ-13, and SSZ-62, including mixtures of two or more thereof, more preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof,
more preferably from the group consisting of Chabazite, Linde D, Linde R, SAPO-34, SSZ-13, and SSZ-62, including mixtures of two or more thereof,
more preferably from the group consisting of Chabazite, SSZ-13, and SSZ-62, including mixtures of two or three thereof,
wherein more preferably the second zeolitic material obtained in (2) comprises chabazite and/or SSZ-13, preferably SSZ-13, and wherein more preferably the second zeolitic material obtained in (2) is chabazite and/or SSZ-13, preferably SSZ-13.

With regard to the second zeolitic material obtained in (2) which has a different type of framework structure than the first zeolitic material contained in the mixture obtained in (1), it is alternatively preferred that the second zeolitic material obtained in (2) has an AEI-type framework structure, wherein preferably the zeolitic material having an AEI-type framework structure is selected from the group consisting of SSZ-39, SAPO-18, SIZ-8, including mixtures of two or more thereof, wherein more preferably the second zeolitic material obtained in (2) comprises SSZ-39, and wherein more preferably the second zeolitic material obtained in (2) is SSZ-39.

Regarding the one or more structure directing agents in (1), while there are no specific restrictions, it is preferred that the one or more structure directing agents comprises one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain.

Preferably, $R^1$ and $R^2$ independently from one another stand for optionally substituted and/or optionally branched $(C_1-C_6)$alkyl, more preferably $(C_1-C_5)$alkyl, more preferably $(C_1-C_4)$alkyl, more preferably $(C_1-C_3)$alkyl, and more preferably for optionally substituted methyl or ethyl, wherein more preferably $R^1$ and $R^2$ independently from one another stand for optionally substituted methyl or ethyl, preferably unsubstituted methyl or ethyl.

Preferably, $R^3$ and $R^4$ form a common derivatized or underivatized, preferably underivatized alkyl chain, more preferably a common $(C_4-C_8)$alkyl chain, more preferably a common $(C_4-C_7)$alkyl chain, more preferably a common $(C_4-C_6)$alkyl chain, wherein more preferably said common alkyl chain is a derivatized or underivatized, preferably underivatized $C_4$ or $C_5$ alkyl chain, and more preferably a derivatized or underivatized, preferably underivatized $C_5$ alkyl chain.

Preferably, the one or more tetraalkylammonium cation $R^1R^2R^3R^4N^+$-containing compounds comprise one or more ammonium compounds selected from the group consisting of derivatized or underivatized, preferably underivatized N,N-di($C_1$-$C_4$)alkyl-3,5-di($C_1$-$C_4$)alkylpyrrolidinium compounds, N,N-di($C_1$-$C_4$)alkyl-3,5-di($C_1$-$C_4$)alkylpiperidinium compounds, N,N-di($C_1$-$C_4$)alkyl-3,5-di($C_1$-$C_4$)alkylhexahydroazepinium compounds, N,N-di($C_1$-$C_4$)alkyl-2,6-di($C_1$-$C_4$)alkylpyrrolidinium compounds, N,N-di($C_1$-$C_4$)alkyl-2,6-di($C_1$-$C_4$)alkylpiperidinium compounds, N,N-di($C_1$-$C_4$)alkyl-2,6-di($C_1$-$C_4$)alkylhexahydroazepinium compounds, and mixtures of two or more thereof,
more preferably from the group consisting of N,N-di($C_1$-$C_4$)alkyl-3,5-di($C_1$-$C_4$)alkylpyrrolidinium compounds, N,N-di($C_1$-$C_4$)alkyl-3,5-di($C_1$-$C_4$)alkylpiperidinium compounds, N,N-di($C_1$-$C_4$)alkyl-3,5-di($C_1$-$C_4$)alkylhexahydroazepinium compounds, N,N-di($C_1$-$C_4$)alkyl-2,6-di($C_1$-$C_4$)alkylpyrrolidinium compounds, N,N-di($C_1$-$C_4$)alkyl-2,6-di($C_1$-$C_4$)alkylpiperidinium compounds, N,N-di($C_1$-$C_4$)alkyl-2,6-di($C_1$-$C_4$)alkylhexahydroazepinium compounds, and mixtures of two or more thereof,
more preferably from the group consisting of N,N-di($C_1$-$C_3$)alkyl-3,5-di($C_1$-$C_3$)alkylpyrrolidinium compounds, N,N-di($C_1$-$C_3$)alkyl-3,5-di($C_1$-$C_3$)alkylpiperidinium compounds, N,N-di($C_1$-$C_3$)alkyl-3,5-di($C_1$-$C_3$)alkylhexahydroazepinium compounds, N,N-di($C_1$-$C_3$)alkyl-2,6-di($C_1$-$C_3$)alkylpyrrolidinium compounds, N,N-di($C_1$-$C_3$)alkyl-2,6-di($C_1$-$C_3$)alkylpiperidinium compounds, N,N-di($C_1$-$C_3$)alkyl-2,6-di($C_1$-$C_3$)alkylhexahydroazepinium compounds, and mixtures of two or more thereof,
more preferably from the group consisting of N,N-di($C_1$-$C_2$)alkyl-3,5-di($C_1$-$C_2$)alkylpyrrolidinium compounds, N,N-di($C_1$-$C_2$)alkyl-3,5-di($C_1$-$C_2$)alkylpiperidinium compounds, N,N-di($C_1$-$C_2$)alkyl-3,5-di($C_1$-$C_2$)alkylhexahydroazepinium compounds, N,N-di($C_1$-$C_2$)alkyl-2,6-di($C_1$-$C_2$)alkylpyrrolidinium compounds, N,N-di($C_1$-$C_2$)alkyl-2,6-di($C_1$-$C_2$)alkylpiperidinium compounds, N,N-di($C_1$-$C_2$)alkyl-2,6-di($C_1$-$C_2$)alkylhexahydroazepinium compounds, and mixtures of two or more thereof,
more preferably from the group consisting of N,N-di($C_1$-$C_2$)alkyl-3,5-di($C_1$-$C_2$)alkylpiperidinium compounds, N,N-di($C_1$-$C_2$)alkyl-2,6-di($C_1$-$C_2$)alkylpiperidinium compounds, and mixtures of two or more thereof, wherein more preferably the one or more tetraalkylammonium cation $R^1R^2R^3R^4N^+$-containing compounds comprise one or more N,N-dimethyl-3,5-dimethylpiperidinium and/or N,N-diethyl-2,6-dimethylpiperidinium compounds.

Preferably, the N,N-dialkyl-2,6-dialkylpyrrolidinium compounds, N,N-dialkyl-2,6-dialkylpiperidinium compounds, and/or N,N-dialkyl-2,6-dialkylhexahydroazepinium compounds display the cis configuration, the trans configuration, or contain a mixture of the cis and trans isomers, wherein more preferably the N,N-dialkyl-2,6-dialkylpyrrolidinium compounds, N,N-dialkyl-2,6-dialkylpiperidinium compounds, and/or N,N-dialkyl-2,6-dialkylhexahydroazepinium compounds display the cis configuration, wherein more preferably the one or more tetraalkylammonium cation $R^1R^2R^3R^4N^+$-containing compounds comprise one or more ammonium compounds selected from the group consisting of derivatized or underivatized, preferably underivatized N,N-di($C_1$-$C_2$)alkyl-cis-2,6-di($C_1$-$C_2$)alkylpiperidinium compounds, and mixtures of two or more thereof, wherein more preferably the one or more tetraalkylammonium cation $R^1R^2R^3R^4N^+$-containing compounds comprise one or more N,N-diethyl-cis-2,6-dimethylpiperidinium compounds.

Preferably the one or more tetraalkylammonium cation $R^1R^2R^3R^4N^+$-containing compounds are salts, more preferably one or more salts selected from the group consisting of halides, sulfate, nitrate, phosphate, acetate, and mixtures of two or more thereof, more preferably from the group consisting of bromide, chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or bromides, and more preferably tetraalkylammonium hydroxides.

If the one or more structure directing agents in (1) comprises one or more tetraalkylammonium cation $R^1R^2R^3R^4N^+$-containing compounds, it is preferred that the molar ratio $H_2O:SiO_2$ of water to $SiO_2$ in the framework structure of the first zeolitic material in the mixture prepared according to (1) ranges from 1 to 80, more preferably from 5 to 60, more preferably from 10 to 55, more preferably from 15 to 50, more preferably from 20 to 45, more preferably from 25 to 40, and more preferably from 30 to 35.

Regarding the one or more structure directing agents according to (1), if $R^1R^2R^3R^4N^+$-containing compounds are comprised in the mixture prepared according to (1), it is preferred that the mixture prepared in (1) and heated in (2) displays an $R^1R^2R^3R^4N^+:SiO_2$ molar ratio of the one or more tetraalkylammonium cations to $SiO_2$ in the framework structure of the first zeolitic material in the range of from 0.01 to 1.5, more preferably from 0.05 to 1, more preferably from 0.1 to 0.8, more preferably from 0.3 to 0.5, more preferably from 0.5 to 0.3, more preferably from 0.8 to 0.25, more preferably from 0.1 to 0.2, more preferably from 0.12 to 0.17, and more preferably from 0.13 to 0.15. With regard to the first zeolitic material in (1) comprising $SiO_2$ and $X_2O_3$, independently from one another, the framework structure of the first zeolitic material displays a $SiO_2:X_2O_3$ molar ratio ranging from 4 to 120, preferably from 6 to 100, more preferably from 8 to 81, more preferably from 15 to 61, more preferably from 25 to 41, and more preferably from 29 to 34. Alternatively, the framework structure of the first zeolitic material displays a $SiO_2:X_2O_3$ molar ratio preferably ranging from 4 to 80, more preferably from 6 to 50, more preferably from 8 to 30, more preferably from 10 to 20, more preferably from 10 to 17, and more preferably from 13 to 16. While there are no specific restrictions, it is preferred that the mixture prepared in (1) and heated in (2) further comprises at least one source for $OH^-$, wherein the mixture displays an $OH^-:SiO_2$ molar ratio of hydroxide to $SiO_2$ in the framework structure of the first zeolitic material in the range of from 0.05 to 1, more preferably from 0.1 to 0.7, more preferably from 0.2 to 0.6, more preferably from 0.3 to 0.55, more preferably from 0.35 to 0.5, more preferably from 0.4 to 0.46, and more preferably from 0.42 to 0.44.

Regarding the one or more structure directing agents in (1), while there are no specific restrictions, it is alternatively preferred that the one or more structure directing agents comprises one or more quaternary phosphonium cation $R^1R^2R^3R^4P^+$-containing compounds, wherein $R^1$, $R^2$, $R^3$, and $R^4$ independently from one another stand for optionally substituted and/or optionally branched ($C_1$-$C_6$)alkyl, more preferably ($C_1$-$C_5$)alkyl, more preferably ($C_1$-$C_4$)alkyl, more preferably ($C_2$-$C_3$)alkyl, and more preferably for optionally substituted methyl or ethyl, wherein more preferably $R^1$, $R^2$, $R^3$, and $R^4$ stand for optionally substituted ethyl, preferably unsubstituted ethyl.

Preferably, the one or more quaternary phosphonium cation $R^1R^2R^3R^4P^+$-containing compounds are salts, more preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more quaternary phosphonium cation containing compounds are hydroxides and/or chlorides, and more preferably hydroxides.

If the one or more structure directing agents in (1) comprises one or more quaternary phosphonium cation $R^1R^2R^3R^4P^+$-containing compounds, it is preferred that the molar ratio $H_2O:SiO_2$ of water to $SiO_2$ in the framework structure of the first zeolitic material in the mixture prepared according to (1) ranges from 1 to 80, more preferably from 1.5 to 50, more preferably from 2 to 30, more preferably from 2.5 to 15, more preferably from 3 to 10, more preferably from 3.5 to 8, more preferably from 4 to 6, and more preferably from 4.5 to 5.5.

Regarding the one or more structure directing agents according to (1), if $R^1R^2R^3R^4P^+$-containing compounds are comprised in the mixture prepared according to (1), it is preferred that the mixture prepared in (1) and heated in (2) displays an $R^1R^2R^3R^4P^+:SiO_2$ molar ratio of the one or more quaternary phosphonium cations to $SiO_2$ in the framework structure of the first zeolitic material in the range of from 0.01 to 2, more preferably from 0.05 to 1.5, more preferably from 0.1 to 1, more preferably from 0.3 to 0.8, more preferably from 0.5 to 0.5, more preferably from 0.8 to 0.4, more preferably from 0.1 to 0.35, more preferably from 0.12 to 0.3, more preferably from 0.15 to 0.25, more preferably from 0.17 to 0.23, and more preferably from 0.19 to 0.21. With regard to the first zeolitic material in (1) comprising $SiO_2$ and $X_2O_3$, independently from one another, the framework structure of the first zeolitic material displays a $SiO_2:X_2O_3$ molar ratio preferably ranging from 1 to 150, more preferably from 5 to 100, more preferably from 10 to 70, more preferably from 15 to 50, more preferably from 20 to 40, more preferably from 25 to 35, and more preferably from 28 to 32. While there are no specific restrictions, it is preferred that the mixture prepared in (1) and heated in (2) further comprises at least one source for $OH^-$, wherein the mixture displays an $OH^-:SiO_2$ molar ratio of hydroxide to $SiO_2$ in the framework structure of the first zeolitic material in the range of from 0.01 to 0.3, more preferably from 0.03 to 0.2, more preferably from 0.05 to 0.15, and more preferably from 0.08 to 0.12.

While there are no specific restrictions, it is preferred that X is selected from the group consisting of Al, B, In, Ga, and mixtures of two or more thereof, X more preferably being Al and/or B, and more preferably being Al.

As to step (2), it is preferred that the heating in (2) is conducted at a temperature ranging from 80 to 230° C., preferably from 90 to 210° C., more preferably from 100 to 200° C., more preferably from 110 to 190° C., more preferably from 115 to 180° C., more preferably from 120 to 170° C., more preferably from 125 to 160° C., more preferably from 130 to 150° C., and more preferably from 135 to 145° C. Preferably, the heating in (2) is conducted for a period in the range of from 3 h to 12 d, preferably from 6 h to 10 d, more preferably from 12 h to 8 d, more preferably from 18 h to 6 d, more preferably from 1 d to 5.5 d, more preferably from 1.5 d to 5 d, more preferably from 2 d to 4.5 d, and more preferably from 2.5 d to 3.5 d. The heating in (2) is preferably conducted under autogenous pressure, preferably under solvothermal conditions, more preferably under hydrothermal conditions, wherein preferably heating in (2) is performed in a pressure tight vessel, preferably in an autoclave.

In the context of the present invention, it is preferred that after obtaining a second zeolitic material in (2) the process further comprises one or more of:
(2a) isolating the zeolitic material obtained in (2), preferably by filtration, and/or
(2b) washing the zeolitic material obtained in (2) or (2a), and/or
(2c) drying the zeolitic material obtained in any of (2), (2a), or (2b).

In the context of the present invention, it is preferred that the process further comprises
(3) calcining the second zeolitic material obtained in (2).

In the context of the present invention, it is preferred that the process further comprises
(4) subjecting the zeolitic material obtained in (2) or (3) to an ion-exchange procedure, wherein preferably one or more ionic extra-framework elements contained in the zeolite framework is ion-exchanged against $H^+$ and/or $NH_4^+$, more preferably against $NH_4^+$.

While there are no specific restrictions, it is preferred that in (4) one or more ionic extra-framework elements contained in the zeolite framework is ion-exchanged against one or more cations and/or cationic elements selected from the group consisting of Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of Sr, Cr, Mo, Fe, Co, Ni, Cu, Zn, Ag, and mixtures of two or more thereof, more preferably from the group consisting of Cr, Mg, Mo, Fe, Ni, Cu, Zn, Ag, and mixtures of two or more thereof, more preferably from the group consisting of Mg, Mo, Fe, Ni, Cu, Zn, Ag, and mixtures of two or more thereof, wherein more preferably the one or more cation and/or cationic elements comprise Cu and/or Fe, preferably Cu, wherein even more preferably the one or more cation and/or cationic elements consist of Cu and/or Fe, preferably of Cu; wherein the one or more ionic extra-framework elements preferably comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, more preferably Na.

In the context of the present invention, it is preferred that the process further comprises
(5) calcining the zeolitic material obtained in (4).

If step (3), (4) or (5) are carried out, preferably the temperature of calcination in (3) and/or (5) is in the range of from 300 to 900° C., preferably of from 400 to 700° C., more preferably of from 450 to 650° C., and more preferably of from 500 to 600° C. Preferably, calcining in (3) and/or (5) is conducted for a period in the range of from 0.5 to 15 h, preferably from 1 to 12 h, more preferably from 2 to 10 h, more preferably from 2.5 to 9 h, more preferably from 3 to 7 h, more preferably from 3.5 to 6.5 h, more preferably from 4 to 6 h. Alternatively, calcining in (3) and/or (5) is conducted for a period in the range of from 0.5 to 10 h, preferably from 1 to 15 h, more preferably from 2 to 12 h, more preferably from 2.5 to 9 h, more preferably from 3 to 7 h, more preferably from 3.5 to 6.5 h, more preferably from 4 to 6 h, more preferably from 4.5 to 5.5 h, and more preferably from 3 to 12 h.

While there are no specific restrictions, it is preferred that the mixture prepared in (1) further comprises seed crystals, wherein preferably the seed crystals comprise a zeolitic material having a CHA-type and/or an AEI-type framework structure, wherein more preferably the zeolitic material of the seed crystals is obtainable and/or obtained according to the process described herein above. Preferably, the zeolitic material having a CHA-type framework structure comprised in the seed crystals is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li—Na| [Al—Si—O]-CHA, (Ni(deta)2)-UT-6, SSZ-13, and SSZ-62, including mixtures of two or more thereof,
preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof,
more preferably from the group consisting of Chabazite, Linde D, Linde R, SAPO-34, SSZ-13, and SSZ-62, including mixtures of two or more thereof,
more preferably from the group consisting of Chabazite, SSZ-13, and SSZ-62, including mixtures of two or three thereof,
wherein more preferably the zeolitic material having a CHA-type framework structure comprised in the seed crystals is chabazite and/or SSZ-13, preferably SSZ-13. Preferably, the zeolitic material having an AEI-type framework structure comprised in the seed crystals is selected from the group consisting of SSZ-39, SAPO-18, SIZ-8, including mixtures of two or more thereof, wherein preferably the zeolitic material having an AEI-type framework structure comprised in the seed crystals is SSZ-39. Preferably, the amount of seed crystals in the mixture prepared in (1) and heated in (2) ranges from 0.1 to 10 wt.-% based on 100 wt.-% of $SiO_2$ in the framework structure of the first zeolitic material, preferably from 0.5 to 5 wt.-%, more preferably from 1 to 3 wt.-%, more preferably from 1.5 to 2.5 wt.-% based on 100 wt.-% of $SiO_2$ in the framework structure of the first zeolitic material.

The present invention further relates to a zeolitic material comprising $SiO_2$ and $X_2O_3$ in its framework structure obtainable and/or obtained according to the process described herein above.

Preferably, the zeolitic material has a CHA-type framework structure, wherein more preferably the zeolitic material is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li—Na| [Al—Si—O]-CHA, (Ni(deta)2)-UT-6, SSZ-13, and SSZ-62, including mixtures of two or more thereof,
more preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof,
more preferably from the group consisting of Chabazite, Linde D, Linde R, SAPO-34, SSZ-13, and SSZ-62, including mixtures of two or more thereof,
more preferably from the group consisting of Chabazite, SSZ-13, and SSZ-62, including mixtures of two or three thereof,
wherein more preferably the zeolitic material comprises chabazite and/or SSZ-13, preferably SSZ-13, and wherein more preferably the zeolitic material is chabazite and/or SSZ-13, preferably SSZ-13.

It is alternatively preferred that the zeolitic material has an AEI-type framework structure, wherein more preferably the zeolitic material is selected from the group consisting of SSZ-39, SAPO-18, SIZ-8, including mixtures of two or more thereof, wherein more preferably the zeolitic material comprises SSZ-39, and wherein more preferably the zeolitic material is SSZ-39.

Depending on the intended use of the zeolitic material, the material can be employed as such. Furthermore, it is conceivable that this zeolitic material is subjected to one or more further post-treatment steps. For example, the zeolitic material which is more preferably obtained as a powder can be suitably processed to a molding or a shaped body by any suitably method, including, but no restricted to, extruding, tableting, spraying and the like. Preferably, the shaped body may have a rectangular, a triangular, a hexagonal, a square, an oval or a circular cross section, and/or preferably is in the form of a star, a tablet, a sphere, a cylinder, a strand, or a hollow cylinder. When preparing a shaped body, one or more binders can be used which may be chosen according to the intended use of the shaped body. Possible binder materials include, but are not restricted to, graphite, silica, titania, zirconia, alumina, and a mixed oxide of two or more of silicon, titanium and zirconium. The weight ratio of the zeolitic material relative to the binder is generally not subject to any specific restrictions and may be, for example, in the range of from 10:1 to 1:10. According to a further example according to which the zeolitic material is used, for example, as a catalyst or as a catalyst component for treating an exhaust gas stream, for example an exhaust gas stream of an engine, it is possible that the zeolitic material is used as a component of a washcoat to be applied onto a suitable substrate, such as a wall-flow filter or the like.

The zeolitic material of the present invention comprising $SiO_2$ and $X_2O_3$ in its framework structure can be used for any conceivable purpose, including, but not limited to, a molecular sieve, as an adsorbent, for ion-exchange, or as a catalyst and/or as a catalyst support, preferably as a catalyst for the selective catalytic reduction (SCR) of nitrogen oxides $NO_x$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_x$, and more preferably for the selective catalytic reduction (SCR) of nitrogen oxides $NO_x$ in exhaust gas from a combustion engine, preferably from a diesel engine or from a lean burn gasoline engine.

The present invention is further illustrated by the following embodiments and combinations of embodiments as indicated by the respective dependencies and back-references. In particular, it is noted that in each instance where a range of embodiments is mentioned, for example in the context of a term such as "The . . . of any of embodiments 1 to 4", every embodiment in this range is meant to be explicitly disclosed for the skilled person, i.e. the wording of this term is to be understood by the skilled person as being synonymous to "The . . . of any of embodiments 1, 2, 3, and 4".

1. A process for the preparation of a zeolitic material comprising $SiO_2$ and $X_2O_3$ in its framework structure, wherein X stands for a trivalent element, wherein said process comprises:
    (1) preparing a mixture comprising one or more structure directing agents and a first zeolitic material comprising $SiO_2$ and $X_2O_3$ in its framework structure, wherein the first zeolitic material has an FER-, TON-, MTT-, BEA-, MEL-, MWW-, MFS-, and/or MFI-type framework structure, preferably a BEA- and/or MFI-type framework structure;
    (2) heating the mixture obtained in (1) for obtaining a second zeolitic material comprising $SiO_2$ and $X_2O_3$ in its framework structure, wherein the second zeolitic material obtained in (2) has a different type of framework structure than the first zeolitic material contained in the mixture obtained in (1).
2. The process of embodiment 1, wherein the mixture prepared according to (1) further comprises one or more solvents, wherein said one or more solvents preferably comprises water, preferably distilled water, wherein more preferably water is contained as the one or more solvents in the mixture prepared according to (1), preferably distilled water.
3. The process of embodiment 2, wherein the mixture prepared in (1) and heated in (2) further comprises at least one source for OH$^-$, wherein said at least one source for OH preferably comprises a metal hydroxide, more preferably a hydroxide of an alkali metal M, more preferably sodium and/or potassium hydroxide, and more preferably sodium hydroxide, wherein more preferably the at least one source for OH is sodium hydroxide.
4. The process of any of embodiments 1 to 3, wherein the first zeolitic material having a BEA-type framework structure is selected from the group consisting of zeolite beta, Tschernichite, [B—Si—O]—*BEA, CIT-6, [Ga—Si—O]—*BEA, Beta polymorph B, SSZ-26, SSZ-33, Beta polymorph A, [Ti—Si—O]—*BEA, and pure silica beta, including mixtures of two or more thereof, preferably from the group consisting of zeolite beta, CIT-6, Beta polymorph B, SSZ-26, SSZ-33, Beta polymorph A, and pure silica beta, including mixtures of two or more thereof, wherein more preferably the first zeolitic material having a BEA-type framework structure comprises zeolite beta, preferably zeolite beta obtained from organotemplate-free synthesis, wherein more preferably the first zeolitic material having a BEA-type framework structure is zeolite beta, preferably zeolite beta obtained from organotemplate mediated synthesis or obtained from organotemplate-free synthesis, and more preferably zeolite beta obtained from organotemplate-free synthesis.

5. The process of any of embodiments 1 to 4, wherein the first zeolitic material having an MFI-type framework structure is selected from the group consisting of Silicalite, ZSM-5, [Fe—Si—O]-MFI, [Ga—Si—O]-MFI, [As—Si—O]-MFI, AMS-1B, AZ-1, Bor-C, Encilite, Boralite C, FZ-1, LZ-105, Mutinaite, NU-4, NU-5, TS-1, TSZ, TSZ-III, TZ-01, USC-4, USI-108, ZBH, ZKQ-1B, ZMQ-TB, MnS-1, and FeS-1, including mixtures of two or more thereof, preferably from the group consisting of Silicalite, ZSM-5, AMS-1B, AZ-1, Encilite, FZ-1, LZ-105, Mutinaite, NU-4, NU-5, TS-1, TSZ, TSZ-III, TZ-01, USC-4, USI-108, ZBH, ZKQ-1B, and ZMQ-TB, including mixtures of two or more thereof,
wherein more preferably the first zeolitic material having an MFI-type framework structure comprises Silicalite and/or ZSM-5, preferably ZSM-5,
wherein more preferably the first zeolitic material having an MFI-type framework structure is zeolite Silicalite and/or ZSM-5, preferably ZSM-5.

6. The process of any of embodiments 1 to 5, wherein the first zeolitic material having an FER-type framework structure is selected from the group consisting of Ferrierite, [Ga—Si—O]-FER, [Si—O]-FER, FU-9, ISI-6, NU-23, Sr-D, ZSM-35, and [B—Si—O]-FER, including mixtures of two or more thereof,
preferably from the group consisting of Ferrierite, FU-9, ISI-6, NU-23, and ZSM-35, including mixtures of two or more thereof, wherein more preferably the first zeolitic material having an FER-type framework structure is Ferrierite.

7. The process of any of embodiments 1 to 6, wherein the first zeolitic material having an TON-type framework structure is selected from the group consisting of Theta-1, ZSM-22, ISI-1, KZ-2, and NU-10, including mixtures of two or more thereof,
wherein preferably the first zeolitic material having a TON-type framework structure is ZSM-22.

8. The process of any of embodiments 1 to 7, wherein the first zeolitic material having an MTT-type framework structure is selected from the group consisting of ZSM-23, EU-13, ISI-4, and KZ-1, including mixtures of two or more thereof,
wherein preferably the first zeolitic material having a MTT-type framework structure is ZSM-23.

9. The process of any of embodiments 1 to 8, wherein the first zeolitic material having an MEL-type framework structure is selected from the group consisting of Boralite D, SSZ-46, and ZSM-11, including mixtures of two or more thereof,
wherein more preferably the first zeolitic material having an MEL-type framework structure comprises ZSM-11,
wherein more preferably the first zeolitic material having an MEL-type framework structure is ZSM-11.

10. The process of any of embodiments 1 to 9, wherein the first zeolitic material having an MWW-type framework structure is selected from the group consisting of MCM-22, ERB-1, ITQ-1, PSH-3, and SSZ-25 and MCM-22, including mixtures of two or more thereof, wherein more preferably the first zeolitic material having an MWW-type framework structure comprises MCM-22,
wherein more preferably the first zeolitic material having an MWW-type framework structure is MCM-22.

11. The process of any of embodiments 1 to 10, wherein the first zeolitic material having an MFS-type framework structure comprises ZSM-57, wherein more preferably the first zeolitic material having an MFS-type framework structure is ZSM-57.

12. The process of any of embodiments 1 to 11, wherein the second zeolitic material obtained in (2) has a CHA-type framework structure, wherein preferably the zeolitic material having a CHA-type framework structure is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li—Na| [Al—Si—O]-CHA, (Ni(deta)2)-UT-6, SSZ-13, and SSZ-62, including mixtures of two or more thereof,
more preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof,
more preferably from the group consisting of Chabazite, Linde D, Linde R, SAPO-34, SSZ-13, and SSZ-62, including mixtures of two or more thereof,
more preferably from the group consisting of Chabazite, SSZ-13, and SSZ-62, including mixtures of two or three thereof,
wherein more preferably the second zeolitic material obtained in (2) comprises chabazite and/or SSZ-13, preferably SSZ-13, and wherein more preferably the second zeolitic material obtained in (2) is chabazite and/or SSZ-13, preferably SSZ-13.

13. The process of any of embodiments 1 to 12, wherein the second zeolitic material obtained in (2) has an AEI-type framework structure, wherein preferably the zeolitic material having an AEI-type framework structure is selected from the group consisting of SSZ-39, SAPO-18, SIZ-8, including mixtures of two or more thereof, wherein more preferably the second zeolitic material obtained in (2) comprises SSZ-39, and wherein more preferably the second zeolitic material obtained in (2) is SSZ-39.

14. The process of any of embodiments 1 to 13, wherein the one or more structure directing agents comprises one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain.

15. The process of embodiment 14, wherein $R^1$ and $R^2$ independently from one another stand for optionally substituted and/or optionally branched $(C_1-C_6)$alkyl, preferably $(C_1-C_5)$alkyl, more preferably $(C_1-C_4)$alkyl, more preferably $(C_1-C_3)$alkyl, and more preferably for optionally substituted methyl or ethyl, wherein more preferably $R^1$ and $R^2$ independently from one another stand for optionally substituted methyl or ethyl, preferably unsubstituted methyl or ethyl.

16. The process of embodiment 14 or 15, wherein $R^3$ and $R^4$ form a common derivatized or underivatized, preferably underivatized alkyl chain, preferably a common $(C_4-C_8)$ alkyl chain, more preferably a common $(C_4-C_7)$alkyl chain, more preferably a common $(C_4-C_6)$alkyl chain, wherein more preferably said common alkyl chain is a derivatized or underivatized, preferably underivatized $C_4$ or $C_5$ alkyl chain, and more preferably a derivatized or underivatized, preferably underivatized $C_5$ alkyl chain.

17. The process of any of embodiments 14 to 16, wherein the one or more tetraalkylammonium cation $R^1R^2R^3R^4N^+$-containing compounds comprise one or more ammonium compounds selected from the group consisting of derivatized or underivatized, preferably underivatized N,N-di $(C_1-C_4)$alkyl-3,5-di$(C_1-C_4)$alkylpyrrolidinium compounds, N,N-di$(C_1-C_4)$alkyl-3,5-di$(C_1-C_4)$ alkylpiperidinium compounds, N,N-di$(C_1-C_4)$alkyl-3,5-di$(C_1-C_4)$alkylhexahydroazepinium compounds, N,N-di ($C_1$-$C_4$)alkyl-2,6-di($C_1$-$C_4$)alkylpyrrolidinium compounds, N,N-di($C_1$-$C_4$)alkyl-2,6-di($C_1$-$C_4$)alkylpiperidinium compounds, N,N-di($C_1$-$C_4$)alkyl-2,6-di($C_1$-$C_4$)alkylhexahydroazepinium compounds, and mixtures of two or more thereof, preferably from the group consisting of N,N-di($C_1$-$C_4$)alkyl-3,5-di($C_1$-$C_4$)alkylpyrrolidinium compounds, N,N-di($C_1$-$C_4$)alkyl-3,5-di($C_1$-$C_4$)alkylpiperidinium compounds, N,N-di($C_1$-$C_4$)alkyl-3,5-di($C_1$-$C_4$)alkylhexahydroazepinium compounds, N,N-di($C_1$-$C_4$)alkyl-2,6-di($C_1$-$C_4$)alkylpyrrolidinium compounds, N,N-di($C_1$-$C_4$)alkyl-2,6-di($C_1$-$C_4$)alkylpiperidinium compounds, N,N-di($C_1$-$C_4$)alkyl-2,6-di($C_1$-$C_4$)alkylhexahydroazepinium compounds, and mixtures of two or more thereof, more preferably from the group consisting of N,N-di($C_1$-$C_3$)alkyl-3,5-di($C_1$-$C_3$)alkylpyrrolidinium compounds, N,N-di($C_1$-$C_3$)alkyl-3,5-di($C_1$-$C_3$)alkylpiperidinium compounds, N,N-di($C_1$-$C_3$)alkyl-3,5-di($C_1$-$C_3$)alkylhexahydroazepinium compounds, N,N-di($C_1$-$C_3$)alkyl-2,6-di($C_1$-$C_3$)alkylpyrrolidinium compounds, N,N-di($C_1$-$C_3$)alkyl-2,6-di($C_1$-$C_3$)alkylpiperidinium compounds, N,N-di($C_1$-$C_3$)alkyl-2,6-di($C_1$-$C_3$)alkylhexahydroazepinium compounds, and mixtures of two or more thereof, more preferably from the group consisting of N,N-di($C_1$-$C_2$)alkyl-3,5-di($C_1$-$C_2$)alkylpyrrolidinium compounds, N,N-di($C_1$-$C_2$)alkyl-3,5-di($C_1$-$C_2$)alkylpiperidinium compounds, N,N-di($C_1$-$C_2$)alkyl-3,5-di($C_1$-$C_2$)alkylhexahydroazepinium compounds, N,N-di($C_1$-$C_2$)alkyl-2,6-di($C_1$-$C_2$)alkylpyrrolidinium compounds, N,N-di($C_1$-$C_2$)alkyl-2,6-di($C_1$-$C_2$)alkylpiperidinium compounds, N,N-di($C_1$-$C_2$)alkyl-2,6-di($C_1$-$C_2$)alkylhexahydroazepinium compounds, and mixtures of two or more thereof, more preferably from the group consisting of N,N-di($C_1$-$C_2$)alkyl-3,5-di($C_1$-$C_2$)alkylpiperidinium compounds, N,N-di($C_1$-$C_2$)alkyl-2,6-di($C_1$-$C_2$)alkylpiperidinium compounds, and mixtures of two or more thereof, wherein more preferably the one or more tetraalkylammonium cation $R^1R^2R^3R^4N^+$-containing compounds comprise one or more N,N-dimethyl-3,5-dimethylpiperidinium and/or N,N-diethyl-2,6-dimethylpiperidinium compounds.

18. The process of embodiment 17, wherein the N,N-dialkyl-2,6-dialkylpyrrolidinium compounds, N,N-dialkyl-2,6-dialkylpiperidinium compounds, and/or N,N-dialkyl-2,6-dialkylhexahydroazepinium compounds display the cis configuration, the trans configuration, or contain a mixture of the cis and trans isomers, wherein preferably the N,N-dialkyl-2,6-dialkylpyrrolidinium compounds, N,N-dialkyl-2,6-dialkylpiperidinium compounds, and/or N,N-dialkyl-2,6-dialkylhexahydroazepinium compounds display the cis configuration, wherein more preferably the one or more tetraalkylammonium cation $R^1R^2R^3R^4N^+$-containing compounds comprise one or more ammonium compounds selected from the group consisting of derivatized or underivatized, preferably underivatized N,N-di($C_1$-$C_2$)alkyl-cis-2,6-di($C_1$-$C_2$)alkylpiperidinium compounds, and mixtures of two or more thereof, wherein more preferably the one or more tetraalkylammonium cation $R^1R^2R^3R^4N^+$-containing compounds comprise one or more N,N-diethyl-cis-2,6-dimethylpiperidinium compounds.

19. The process of embodiment 17, wherein the N,N-dialkyl-3,5-dialkylpyrrolidinium compounds, N,N-dialkyl-3,5-dialkylpiperidinium compounds, and/or N,N-dialkyl-3,5-dialkylhexahydroazepinium compounds display the cis configuration, the trans configuration, or contain a mixture of the cis and trans isomers, wherein preferably the N,N-dialkyl-3,5-dialkylpyrrolidinium compounds, N,N-dialkyl-3,5-dialkylpiperidinium compounds, and/or N,N-dialkyl-3,5-dialkylhexahydroazepinium compounds display the cis configuration, wherein more preferably the one or more ammonium cation $R^1R^2R^3R^4N^+$-containing compounds are selected from the group consisting of N,N-di($C_1$-$C_2$)alkyl-cis-3,5-di($C_1$-$C_2$)alkylpiperidinium compounds, and mixtures of two or more thereof, wherein more preferably the one or more ammonium cation containing compounds comprise one or more N,N-dimethyl-cis-3,5-dimethylpiperidinium compounds.

20. The process of any of embodiments 14 to 19, wherein the one or more tetraalkylammonium cation $R^1R^2R^3R^4N^+$-containing compounds are salts, preferably one or more salts selected from the group consisting of halides, sulfate, nitrate, phosphate, acetate, and mixtures of two or more thereof, more preferably from the group consisting of bromide, chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or bromides, and more preferably tetraalkylammonium hydroxides.

21. The process of any of embodiments 14 to 20, wherein the molar ratio $H_2O$:$SiO_2$ of water to $SiO_2$ in the framework structure of the first zeolitic material in the mixture prepared according to (1) ranges from 1 to 80, preferably from 5 to 60, more preferably from 10 to 55, more preferably from 15 to 50, more preferably from 20 to 45, more preferably from 25 to 40, and more preferably from 30 to 35.

22. The process of any of embodiments 14 to 21, wherein the mixture prepared in (1) and heated in (2) displays an $R^1R^2R^3R^4N^+$:$SiO_2$ molar ratio of the one or more tetraalkylammonium cations to $SiO_2$ in the framework structure of the first zeolitic material in the range of from 0.01 to 1.5, preferably from 0.05 to 1, more preferably from 0.1 to 0.8, more preferably from 0.3 to 0.5, more preferably from 0.5 to 0.3, more preferably from 0.8 to 0.25, more preferably from 0.1 to 0.2, more preferably from 0.12 to 0.17, and more preferably from 0.13 to 0.15.

23. The process of any of embodiments 14 to 22, wherein independently from one another, the framework structure of the first zeolitic material displays a $SiO_2$:$X_2O_3$ molar ratio ranging from 4 to 120, preferably from 6 to 100, more preferably from 8 to 81, more preferably from 15 to 61, more preferably from 25 to 41, and more preferably from 29 to 34.

24. The process of any of embodiments 14 to 22, wherein independently from one another, the framework structure of the first zeolitic material displays a $SiO_2$:$X_2O_3$ molar ratio ranging from 4 to 80, more preferably from 6 to 50, more preferably from 8 to 30, more preferably from 10 to 20, more preferably from 10 to 17, and more preferably from 13 to 16.

25. The process of any of embodiments 14 to 24, wherein the mixture prepared in (1) and heated in (2) further comprises at least one source for $OH^-$, wherein the mixture displays an $OH^-$:$SiO_2$ molar ratio of hydroxide to $SiO_2$ in the framework structure of the first zeolitic material in the range of from 0.05 to 1, preferably from 0.1 to 0.7, more preferably from 0.2 to 0.6, more preferably from 0.3 to 0.55, more preferably from 0.35 to 0.5, more preferably from 0.4 to 0.46, and more preferably from 0.42 to 0.44.

26. The process of any of embodiments 1 to 13, wherein the one or more structure directing agents comprises one or more quaternary phosphonium cation $R^1R^2R^3R^4P^+$-containing compounds, wherein $R^1$, $R^2$, $R^3$, and $R^4$ independently from one another stand for optionally substituted and/or optionally branched $(C_1-C_6)$alkyl, preferably $(C_1-C_5)$alkyl, more preferably $(C_1-C_4)$alkyl, more preferably $(C_2-C_3)$alkyl, and more preferably for optionally substituted methyl or ethyl, wherein more preferably $R^1$, $R^2$, $R^3$, and $R^4$ stand for optionally substituted ethyl, preferably unsubstituted ethyl.

27. The process of embodiment 26, wherein the one or more quaternary phosphonium cation $R^1R^2R^3R^4P^+$-containing compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more quaternary phosphonium cation containing compounds are hydroxides and/or chlorides, and more preferably hydroxides.

28. The process of embodiment 26 or 27, wherein the molar ratio $H_2O:SiO_2$ of water to $SiO_2$ in the framework structure of the first zeolitic material in the mixture prepared according to (1) ranges from 1 to 80, preferably from 1.5 to 50, more preferably from 2 to 30, more preferably from 2.5 to 15, more preferably from 3 to 10, more preferably from 3.5 to 8, more preferably from 4 to 6, and more preferably from 4.5 to 5.5.

29. The process of any of embodiments 26 to 28, wherein the mixture prepared in (1) and heated in (2) displays an $R^1R^2R^3R^4P^+:SiO_2$ molar ratio of the one or more quaternary phosphonium cations to $SiO_2$ in the framework structure of the first zeolitic material in the range of from 0.01 to 2, preferably from 0.05 to 1.5, more preferably from 0.1 to 1, more preferably from 0.3 to 0.8, more preferably from 0.5 to 0.5, more preferably from 0.8 to 0.4, more preferably from 0.1 to 0.35, more preferably from 0.12 to 0.3, more preferably from 0.15 to 0.25, more preferably from 0.17 to 0.23, and more preferably from 0.19 to 0.21.

30. The process of any of embodiments 26 to 29, wherein independently from one another, the framework structure of the first zeolitic material displays a $SiO_2:X_2O_3$ molar ratio ranging from 1 to 150, preferably from 5 to 100, more preferably from 10 to 70, more preferably from 15 to 50, more preferably from 20 to 40, more preferably from 25 to 35, and more preferably from 28 to 32.

31. The process of any of embodiments 26 to 30, wherein the mixture prepared in (1) and heated in (2) further comprises at least one source for $OH^-$, wherein the mixture displays an $OH^-:SiO_2$ molar ratio of hydroxide to $SiO_2$ in the framework structure of the first zeolitic material in the range of from 0.01 to 0.3, preferably from 0.03 to 0.2, more preferably from 0.05 to 0.15, and more preferably from 0.08 to 0.12.

32. The process of any of embodiments 1 to 31, wherein X is selected from the group consisting of Al, B, In, Ga, and mixtures of two or more thereof, X preferably being Al and/or B, and more preferably being Al.

33. The process of any of embodiments 1 to 32, wherein the heating in (2) is conducted at a temperature ranging from 80 to 230° C., preferably from 90 to 210° C., more preferably from 100 to 200° C., more preferably from 110 to 190° C., more preferably from 115 to 180° C., more preferably from 120 to 170° C., more preferably from 125 to 160° C., more preferably from 130 to 150° C., and more preferably from 135 to 145° C.

34. The process of any of embodiments 1 to 33, wherein the heating in (2) is conducted for a period in the range of from 3 h to 12 d, preferably from 6 h to 10 d, more preferably from 12 h to 8 d, more preferably from 18 h to 6 d, more preferably from 1 d to 5.5 d, more preferably from 1.5 d to 5 d, more preferably from 2 d to 4.5 d, and more preferably from 2.5 d to 3.5 d.

35. The process of any of embodiments 1 to 34, wherein the heating in (2) is conducted under autogenous pressure, preferably under solvothermal conditions, more preferably under hydrothermal conditions, wherein preferably heating in (2) is performed in a pressure tight vessel, preferably in an autoclave.

36. The process of any of embodiments 1 to 35, wherein after obtaining a second zeolitic material in (2) the process further comprises one or more of:
    (2a) isolating the zeolitic material obtained in (2), preferably by filtration, and/or
    (2b) washing the zeolitic material obtained in (2) or (2a), and/or
    (2c) drying the zeolitic material obtained in any of (2), (2a), or (2b).

37. The process of any of embodiments 1 to 36, further comprising
    (3) calcining the second zeolitic material obtained in (2).

38. The process of any of embodiments 1 to 37, further comprising
    (4) subjecting the zeolitic material obtained in (2) or (3) to an ion-exchange procedure, wherein preferably one or more ionic extra-framework elements contained in the zeolite framework is ion-exchanged against $H^+$ and/or $NH_4^+$, more preferably against $NH_4^+$.

39. The process of embodiment 38, wherein in (4) one or more ionic extra-framework elements contained in the zeolite framework is ion-exchanged against one or more cations and/or cationic elements selected from the group consisting of Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of Sr, Cr, Mo, Fe, Co, Ni, Cu, Zn, Ag, and mixtures of two or more thereof, more preferably from the group consisting of Cr, Mg, Mo, Fe, Ni, Cu, Zn, Ag, and mixtures of two or more thereof, more preferably from the group consisting of Mg, Mo, Fe, Ni, Cu, Zn, Ag, and mixtures of two or more thereof, wherein more preferably the one or more cation and/or cationic elements comprise Cu and/or Fe, preferably Cu, wherein even more preferably the one or more cation and/or cationic elements consist of Cu and/or Fe, preferably of Cu;
wherein the one or more ionic extra-framework elements preferably comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, more preferably Na.

40. The process of embodiment 38 or 39, further comprising
    (5) calcining the zeolitic material obtained in (4).

41. The process of any of embodiments 37 to 40, wherein the temperature of calcination in (3) and/or (5) is in the range of from 300 to 900° C., preferably of from 400 to 700° C., more preferably of from 450 to 650° C., and more preferably of from 500 to 600° C.

42. The process of any of embodiments 37 to 41, wherein calcining in (3) and/or (5) is conducted for a period in the range of from 0.5 to 15 h, preferably from 1 to 12 h, more preferably from 2 to 10 h, more preferably from 2.5 to 9 h, more preferably from 3 to 7 h, more preferably from 3.5 to 6.5 h, more preferably from 4 to 6 h, and more preferably from 4.5 to 5.5 h.

43. The process of any of embodiments 1 to 42, wherein the mixture prepared in (1) further comprises seed crystals, wherein preferably the seed crystals comprise a zeolitic material having a CHA-type and/or an AEI-type framework structure, wherein more preferably the zeolitic material of the seed crystals is obtainable and/or obtained according to any one of embodiments 1 to 28.

44. The process of embodiment 43, wherein the zeolitic material having a CHA-type framework structure comprised in the seed crystals is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li—Na| [Al—Si—O]-CHA, (Ni(deta)2)-UT-6, SSZ-13, and SSZ-62, including mixtures of two or more thereof, preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and
SSZ-62, including mixtures of two or more thereof, more preferably from the group consisting of Chabazite, Linde D, Linde R, SAPO-34, SSZ-13, and SSZ-62, including mixtures of two or more thereof,
more preferably from the group consisting of Chabazite, SSZ-13, and SSZ-62, including mixtures of two or three thereof,
wherein more preferably the zeolitic material having a CHA-type framework structure comprised in the seed crystals is chabazite and/or SSZ-13, preferably SSZ-13.

45. The process of embodiment 43 or 44, wherein the zeolitic material having an AEI-type framework structure comprised in the seed crystals is selected from the group consisting of SSZ-39, SAPO-18, SIZ-8, including mixtures of two or more thereof,
wherein preferably the zeolitic material having an AEI-type framework structure comprised in the seed crystals is SSZ-39.

46. The process of any of embodiments 1 to 45, wherein the amount of seed crystals in the mixture prepared in (1) and heated in (2) ranges from 0.1 to 10 wt.-% based on 100 wt.-% of $SiO_2$ in the framework structure of the first zeolitic material, preferably from 0.5 to 5 wt.-%, more preferably from 1 to 3 wt.-%, more preferably from 1.5 to 2.5 wt.-% based on 100 wt.-% of $SiO_2$ in the framework structure of the first zeolitic material.

47. A zeolitic material obtainable and/or obtained according to the process of any of embodiments 1 to 46.

48. The zeolitic material of embodiment 47, wherein the zeolitic material has a CHA-type framework structure, wherein preferably the zeolitic material is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li—Na| [Al—Si—O]-CHA, (Ni(deta)2)-UT-6, SSZ-13, and SSZ-62, including mixtures of two or more thereof,
more preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof, more preferably from the group consisting of Chabazite, Linde D, Linde R, SAPO-34, SSZ-13, and SSZ-62, including mixtures of two or more thereof,
more preferably from the group consisting of Chabazite, SSZ-13, and SSZ-62, including mixtures of two or three thereof,
wherein more preferably the zeolitic material comprises chabazite and/or SSZ-13, preferably SSZ-13, and wherein more preferably the zeolitic material is chabazite and/or SSZ-13, preferably SSZ-13.

49. The zeolitic material of embodiment 47, wherein the zeolitic material has an AEI-type framework structure, wherein preferably the zeolitic material is selected from the group consisting of SSZ-39, SAPO-18, SIZ-8, including mixtures of two or more thereof, wherein more preferably the zeolitic material comprises SSZ-39, and wherein more preferably the zeolitic material is SSZ-39.

50. Use of a zeolitic material according to any of embodiments 47 to 49 as a molecular sieve, as an adsorbent, for ion-exchange, or as a catalyst and/or as a catalyst support, preferably as a catalyst for the selective catalytic reduction (SCR) of nitrogen oxides $NO_R$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_x$, and more preferably for the selective catalytic reduction (SCR) of nitrogen oxides $NO_x$ in exhaust gas from a combustion engine, preferably from a diesel engine or from a lean burn gasoline engine.

EXPERIMENTAL SECTION

Figure 1:
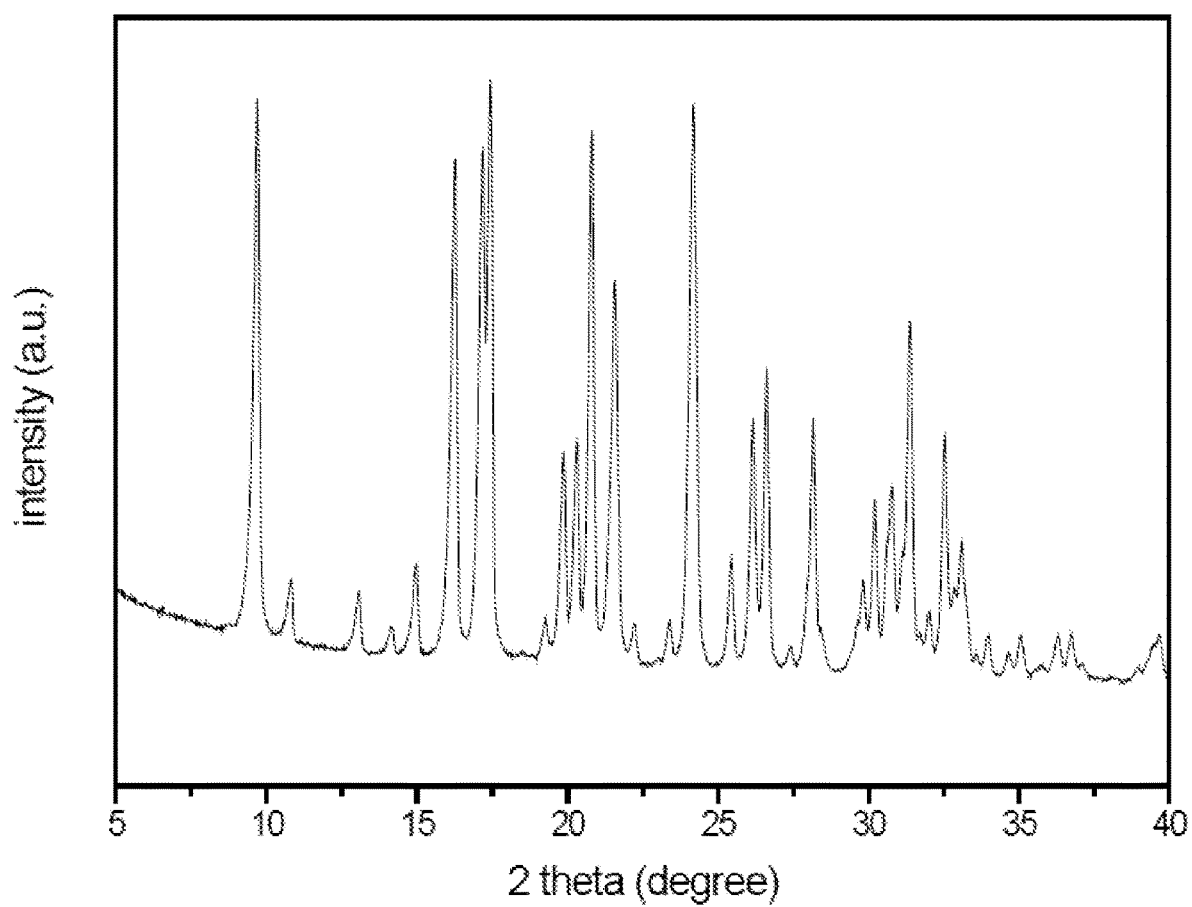
FIG. 1 shows the x-ray diffraction pattern of the zeolitic material obtained according to Example 1. In the figure, the intensity in arbitrary units is plotted along the ordinate and the diffraction angle in ° 2 Theta is plotted along the abscissa.

Reference Example 1: Synthesis of 1,1-diethyl-cis-2,6-dimethyl-piperidinium hydroxide (ROH)

1,1-diethyl-cis-2,6-dimethyl-piperidinium iodide was synthesized by dissolving 36 g of cis-2,6-dimethyl-piperidine and 200 g of iodoethane in 100 g of methanol, adding 64 g of $KHCO_3$, then heating the mixture to 50° C. under stirring and keep it in a dark place for 4 days. The solvent and excess iodoethane were removed under rotary evaporation. The product was dissolved by trichloromethane. After removing the solid by filtration, the solvent was eliminated under rotary evaporation. The product was washed with ether. The product was converted from the iodide to the hydroxide form (denoted as ROH) using an anion exchange resin.

Reference Example 2: Synthesis of N,N-dimethyl-3,5-dimethylpiperidinium hydroxide (DMPOH) for Use as Organic Structure Directing Agent (OSDA)

24 g 3,5-dimethylpiperidine (98%, cis-trans mixture, TCI) were mixed with 220 ml methanol (99.9%, Wako) and 42 g potassium carbonate (99.5%, Wako). Then, 121 g methyl iodide (99.5%, Wako) were added dropwise, and the resulting mixture was heated under reflux for 1 day. After partially removing the methanol by evaporation, chloroform was added and the resulting suspension was stirred. Then, the solids fraction including potassium carbonate was removed by filtration. Then, the remaining mixture was concentrated anew by evaporation to completely remove remaining methanol. Chloroform was added to the resultant and the mixture was stirred. The mixture was subsequently filtered to remove remaining solids. For recrystallization, ethanol was added, and then diethylether was added to precipitate the iodide salt of the desired product. The solids were filtered off and then dried. After that, the solids were mixed with hydroxide ion exchange resin (DIAION SA10AOH, Mitsubishi) and distilled water. The resulting mixture was kept for 1 day. Then, the resin was removed by filtration and an aqueous solution of DMPOH was obtained. The solution had a density of 1.0396 g ml-1 and a molar concentration of 2.254 M.

Reference Example 3: Synthesis of an AEI Zeolite Using FAU Zeolite as Raw Material An AEI zeolite was prepared according to prior art Maruo, T. et al. in Chem. Lett. 2014, 43, page 302-304 by hydrothermal conversion of FAU zeolites in the presence of tetraethylphosphonium cations. The obtained AEI zeolite was ion-exchanged according to the method described herein for Examples 1 and 2 to obtain a Cu-exchanged AEI zeolite prepared from a zeolite Y. The obtained Cu-exchanged zeolite is also designated herein as Cu—Y—SSZ-39. The copper loading of the resulting Cu—Y—SSZ-39 was approximately 2.4 weight-%.

Example 1: Synthesis of AEI Zeolite Using BEA Zeolite as Raw Material

With the organotemplate compound (ROH) obtained according to Reference Example 1, a synthetic mixture with a molar composition of 0.14 ROH:0.11-0.15 $Na_2O$:1.0 $SiO_2$: 0.04 $Al_2O_3$:32 $H_2O$ was prepared by mixing BEA zeolite, ROH, sodium hydroxide, and deionized water. In a typical synthesis, 1 g of zeolite beta (from NANKAI Catalyst Company; Si:Al molar ratio=12.5) was mixed with 10 g of ROH solution (0.23 mol/L ROH) and stirred at room temperature for 2 h. Then, 0.20 g of NaOH was added. The synthesis mixture was stirred at room temperature for 2 h, transferred in a Teflon-lined autoclave oven and crystallized at 140° C. for 1-3 days. After filtrating, washing, and drying, the product was finally obtained.

The x-ray diffraction pattern of the product is displayed in FIG. 1 and displays a reflection pattern characteristic of an AEI-type zeolitic material.

The zeolite obtained displayed a BET surface area of 438 $m^2/g$, a Langmuir surface area of 573 $m^2/g$, a micropore area (t-plot) of 412 $m^2/g$, and a micropore volume (t-plot) of 0.19 $cm^3/g$.

After calcining at 550° C. for 4 h, the calcined product was obtained, which is designated herein as B—SSZ-39. The H-form of the sample (H—B—SSZ-39) was prepared by ion-exchange with 1 M $NH_4NO_3$ solution and calcination at 550° C. for 4 h. This ion-exchange procedure was repeated once. The Cu-form of the sample (Cu—B—SSZ-39) was prepared by ion-exchange the H—B—SSZ-39 zeolite with 0.1 M $Cu(NO_3)_2$ solution and calcination at 550° C. for 4 h. The copper loading of the resulting zeolite Cu—B—SSZ-39 was approximately 2.4 weight-%.

Example 2: Synthesis of AEI Zeolite Using ZSM-5 Zeolite as Raw Material

With the organotemplate compound (ROH) obtained according to Reference Example 1, a synthetic mixture with a molar composition of 0.14 ROH:0.14 $Na_2O$:1.0 $SiO_2$:0.03 $Al_2O_3$:32 $H_2O$ was prepared by mixing ZSM-5 zeolite, ROH, sodium hydroxide, and deionized water. In a typical synthesis, 1 g of ZSM-5 zeolite (from NANKAI Catalyst Company; Si:Al molar ratio=16.7) was mixed with 10 g of ROH solution (0.23 mol/L ROH) and stirred at room temperature for 2 h. Then, 0.20 g of NaOH was added. After stirring at room temperature for 2 h, 0.02 g of H-AEI (SSZ-39) seeds was added. The synthesis mixture was stirred at room temperature for 15 minutes, transferred in a Teflon-lined autoclave oven and crystallized at 140° C. for 2-3 days. After filtrating, washing, and drying, the product was finally obtained.

Figure 2:
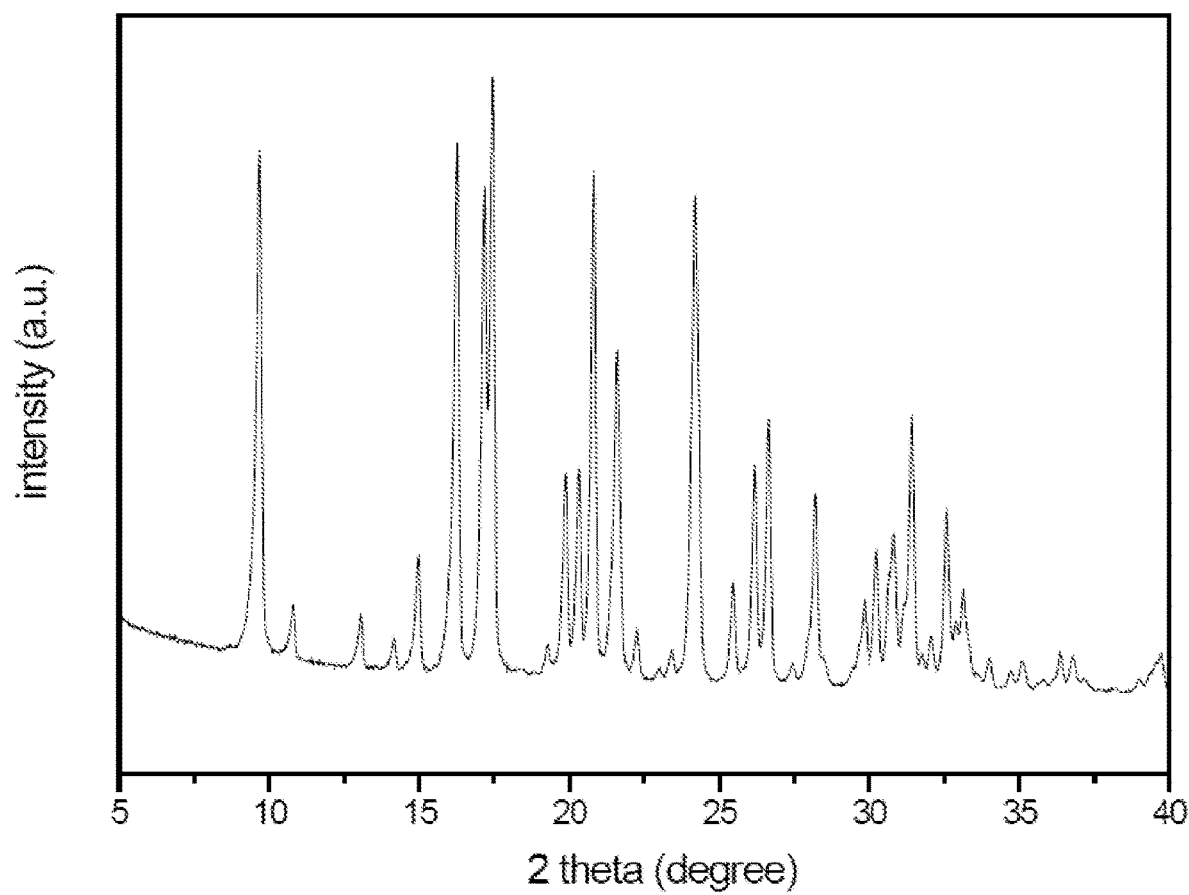
FIG. 2 shows the x-ray diffraction pattern of the zeolitic material obtained according to Example 2. In the figure, the intensity in arbitrary units is plotted along the ordinate and the diffraction angle in ° 2 Theta is plotted along the abscissa.

The x-ray diffraction pattern of the product is displayed in FIG. 2 and displays a reflection pattern characteristic of an AEI-type zeolitic material.

Elemental analysis of the zeolite product revealed an Si:Al molar ratio of 9.5.

After calcining at 550° C. for 4 h, the calcined product was obtained, which is designated herein as Z—SSZ-39. The H-form of the sample (H—Z—SSZ-39) was prepared by ion-exchange with 1 M $NH_4NO_3$ solution and calcination at 550° C. for 4 h. This ion-exchange procedure was repeated once. The Cu-form of the sample (Cu—Z—SSZ-39) was prepared by ion-exchange the H—Z—SSZ-39 zeolite with 0.1 M $Cu(NO_3)_2$ solution and calcination at 550° C. for 4 h. The copper loading of the resulting Cu—Z—SSZ-39 was approximately 2.4 weight-%.

Examples 3-7: Synthesis of AEI Zeolite Using Different Zeolites as Starting Material AEI zeolites have been synthesized starting from zeolites having different framework structures. The general preparation method is disclosed in the following, whereby for each Example a zeolite has been used as starting material having the characteristics as listed in table 1. The molar composition of the reaction mixture is also listed in table 1.

A reaction mixture with a molar composition as listed in table 1 was obtained by mixing a zeolite, DMPOH, sodium hydroxide, deionized water and SSZ-39 zeolite seeds. In a typical synthesis, 1 g of a zeolite was mixed with 10 g of DMPOH solution (0.23 mol/L in water), stirring at room temperature for 2 h. Then, 0.31 g of sodium hydroxide was added. After stirring at room temperature for 2 h, 0.02 g of H-AEI (SSZ-39) zeolite seeds was added. After stirring for 10 min at room temperature, the mixture was transferred into a Teflon-lined autoclave oven and crystallized at 140° C. for 3 days under rotation conditions (50 rpm). After filtering, washing, drying, and calcining at 550° C. for 4 h, the product was finally obtained.

After calcining at 550° C. for 4 h, the calcined product was obtained, which is designated herein as Z—SSZ-39. The H-form of the sample (H—Z—SSZ-39) was prepared by ion-exchange with 1 M $NH_4NO_3$ solution and calcination at 550° C. for 4 h. This ion-exchange procedure was repeated once. The Cu-form of the sample (Cu—Z—SSZ-39) was prepared by ion-exchange the H—Z—SSZ-39 zeolite with 0.1 M $Cu(NO_3)_2$ solution and calcination at 550° C. for 4 h.

TABLE 1

List of characteristics for the different zeolites used as starting materials in Examples 3-7 as well as molar composition of the reaction mixtures for each respective Example

| # | Zeolite | Molar ratio Si:Al of the zeolite | Molar composition of reaction mixture |
|---|---|---|---|
| Example 3 | ZSM-35 (FER) | 30 | 1.0 $SiO_2$:0.017 $Al_2O_3$:0.22 $Na_2O$:0.14 DMPOH:30 $H_2O$:0.02 seeds |
| Example 4 | ZSM-11 (MEL) | 20 | 1.0 $SiO_2$:0.025 $Al_2O_3$:0.22 $Na_2O$:0.14 DMPOH:30 $H_2O$:0.02 seeds |
| Example 5 | ZSM-22 (TON) | 40 | 1.0 $SiO_2$:0.013 $Al_2O_3$:0.22 $Na_2O$:0.14 DMPOH:30 $H_2O$:0.02 seeds |
| Example 6 | MCM-22 (MWW) | 15 | 1.0 $SiO_2$:0.030 $Al_2O_3$:0.22 $Na_2O$:0.14 DMPOH:30 $H_2O$:0.02 seeds |
| Example 7 | ZSM-57 (MFS) | 16.6 | 1.0 $SiO_2$:0.030 $Al_2O_3$:0.11 $Na_2O$:0.14 DMPOH:30 $H_2O$:0.02 seeds |

Example 8: $NO_x$ Conversion in Selective Catalytic Reduction Using Ammonia ($NH_3$—SCR)

Figure 3:
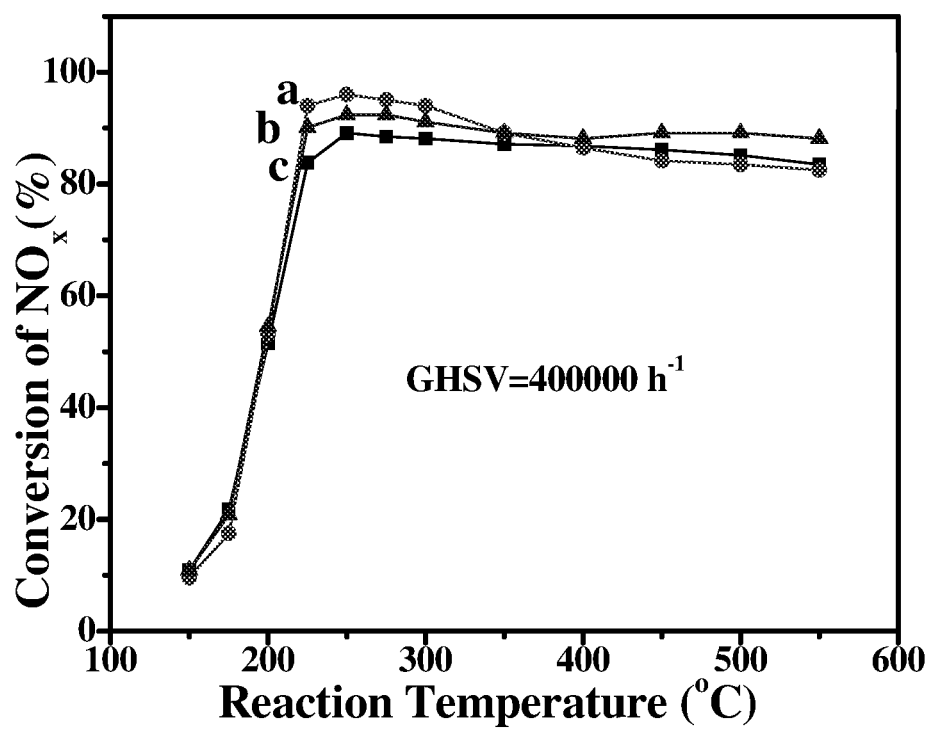
FIG. 3: shows the $NO_x$ conversion relative to the applied reaction temperature in the range of from 100 to 550° C. in the selective catalytic reduction using ammonia over the zeolites Cu—Z—SSZ-39 (●-line designated as a), Cu—B—SSZ-39 (▲-line designated as b) and Cu—Y—SSZ-39 (■-line designated as c) according to Example 2, Example 1, and Reference Example 3, respectively, as catalysts.

FIG. 3 shows the dependence of $NO_x$ conversion on reaction temperature in the range of from 100 to 550° C. in the selective catalytic reduction using ammonia over the zeolites Cu—Z—SSZ-39 (●-line designated as a), Cu—B—SSZ-39 (▲-line designated as b) and Cu—Y—SSZ-39 (■-line designated as c) as catalysts with similar copper loading (2.4 weight-%). As it can be seen from the figure, both Cu—Z—SSZ-39 and Cu—B—SSZ-39 catalysts exhibit excellent catalytic performances, which are completely comparable with those of the Cu—Y—SSZ-39 catalyst. In particular, it can be seen that the conversion of both Cu—Z—SSZ-39 and Cu—B—SSZ-39 is higher in the range of from 200 to 350° C. than of Cu—Y—SSZ-39.

LIST OF THE CITED PRIOR ART REFERENCES

Moliner, M. et al. in Chem. Commun. 2012, 48, pages 8264-8266
Martin, N. et al. in Chem. Commun. 2015, 51, 11030-11033
Maruo, T. et al. in Chem. Lett. 2014, 43, page 302-304
Unpublished international patent application PCT/CN2017/115938
Unpublished international patent application PCT/CN2017/112343
U.S. Pat. No. 5,958,370

The invention claimed is:

1. A process for preparing a zeolite material having a framework structure comprising $SiO_2$ and $X_2O_3$, wherein X is a trivalent element, the process comprising:
   (1) preparing a mixture comprising a structure directing agent and a first zeolite material having a framework structure comprising $SiO_2$ and $X_2O_3$, wherein the first zeolite material has an FER-, TON-, MTT-, BEA-, MEL-, MWW-, MIS-, and/or MFI-type framework structure; and
   (2) heating the mixture, to obtain a second zeolite material having a framework structure comprising $SiO_2$ and $X_2O_3$,
   wherein the second zeolite material obtained in (2) has a different type of framework structure than the first zeolite material comprised in the mixture prepared in (1)
   wherein the second zeolite material obtained in (2) has a CHA-type framework structure or an AEI-type framework structure, and wherein the mixture prepared in (1) and heated in (2) further comprises one source for OH—, wherein said one source consists of sodium hydroxide.

2. The process of claim 1, wherein the mixture prepared in (1) further comprises a solvent.

3. The process of claim 1, wherein the second zeolite material obtained in (2) has a CHA-type framework structure.

4. The process of claim 1, wherein the second zeolite material obtained in (2) has an AEI-type framework structure.

5. The process of claim 1, wherein the structure directing agent comprises a tetraalkylammonium cation $R^1R^2R^3R^4N+$-containing compound,
   wherein $R^1$, $R^2$, $R^3$ and $R^4$ are independently from one another stand for alkyl, and
   wherein $R^3$ and $R^4$ form a common alkyl chain.

6. The process of claim 1, wherein the structure directing agent comprises a quaternary phosphonium cation $R^1R^2R^3R^4P^+$-containing compound,
   wherein $R^1$, $R^2$, $R^3$, and $R^4$ are independently from one another optionally substituted and/or optionally branched $(C_1-C_6)$alkyl.

7. The process of claim 1, wherein X is selected from the group consisting of Al, B, In, Ga, and mixtures of two or more thereof.

8. The process of claim 1, wherein the heating in (2) is conducted under autogenous pressure.

9. The process of claim 1, further comprising
   (3) calcining the second zeolite material obtained in (2).

10. The process of claim 1, further comprising
    (4) subjecting the second zeolite material obtained in (2) to an ion-exchange procedure, optionally after calcining the second zeolite material.

11. A zeolite material, obtainable and/or obtained by the process of claim 1.

12. The zeolite material of claim 11, wherein the zeolite material has a CHA-type framework structure.

13. The zeolite material of claim 11, wherein the zeolite material has an AEI-type framework structure.

14. A process of producing a molecular sieve, an adsorbent, a catalyst and/or a catalyst support, the process comprising obtaining the zeolite material of claim 11.

* * * * *